United States Patent [19]

Asanuma et al.

[11] 4,409,378
[45] Oct. 11, 1983

[54] PROCESS FOR POLYMERIZATION OF α-OLEFINS AND CATALYSTS THEREFOR

[75] Inventors: Tadashi Asanuma, Izumi; Nobutaka Uchikawa; Tetsunosuke Shiomura, both of Takaishi, all of Japan

[73] Assignee: Mitsui Toatsu Chemicals, Inc., Tokyo, Japan

[21] Appl. No.: 471,065

[22] Filed: Mar. 7, 1983

Related U.S. Application Data

[63] Continuation of Ser. No. 268,518, May 29, 1981.

[30] Foreign Application Priority Data

Jul. 11, 1980 [JP] Japan .............................. 55/93878

[51] Int. Cl.$^3$ .................... C08F 4/02; C08F 10/06
[52] U.S. Cl. .................... 526/125; 526/351; 526/906; 502/162
[58] Field of Search .................... 526/125; 252/429 B

[56] References Cited

U.S. PATENT DOCUMENTS

| | | | |
|---|---|---|---|
| 4,180,636 | 12/1979 | Hirota et al. | 526/125 |
| 4,220,745 | 9/1980 | Tanaka et al. | 526/125 |
| 4,242,231 | 12/1980 | Ueno et al. | 526/125 |
| 4,252,929 | 2/1981 | Kuroda et al. | 526/125 |

FOREIGN PATENT DOCUMENTS 1564460  4/1980  United Kingdom ............... 526/125

Primary Examiner—Edward J. Smith
Attorney, Agent, or Firm—Sughrue, Mion, Zinn, Macpeak & Seas

[57] ABSTRACT

Stereospecific polymerization of α-olefins is carried out with use of a catalyst system comprising an activated titanium compound, an organoaluminum compound and an electron donative compound. The activated titanium compound is obtained by copulverizing magnesium halide, a halongenated hydrocarbon and an orthocarboxylic acid ester and then treating the copulverized product with titanium halide.

2 Claims, No Drawings

PROCESS FOR POLYMERIZATION OF α-OLEFINS AND CATALYSTS THEREFOR

This application is a continuation of application Ser. No. 268,518, filed May 29, 1981.

BACKGROUND OF THE INVENTION

This invention relates to a process for the stereospecific polymerization of α-olefins and a catalytic system therefor.

Methods of supporting the titanium compound of Zieagler-Natta catalysts on a carrier to improve the catalyst activity have been developed in a commercial scale for polymerization of α-olefins and generally, have being employed for a catalyst for polymerization of ethylene.

However, in case of polymerization of α-olefins such as propylene and butene, a useful crystalline polymer can not be obtained unless the polymeric chain has an isotactic structure in which alkyl groups such as methyl or ethyl are stereospecifically regulated. Accordingly, catalysts improved only in polymerization activity as the case of ethylene polymerization cannot be considered to be a useful catalyst for polymerization of α-olefins and thus, regulating the stereospecificity of polymer is a significant matter.

In connection with this, there are provided methods adding an electron donative compound as a third component to a mixture of a carrier-type titanium compound supported on magnesium halide and an organoaluminum compound thereby improving the stereospecificity of polymers obtained (e.g. British Pat. No. 1,435,768). Also, Japanese Application Kokai No. 50-126950 discloses a catalytic system comprising a carrier-type titanium compound obtained by treating a copulverized product of magnesium halide and an organic acid ester with titanium tetrachloride and an organoaluminum compound. Furthermore, U.S. Pat. No. 4,220,745 discloses the stereospecific polymerization of α-olefins in the presence of a catalytic system comprising an activated titanium compound obtained by treating a copulverized product of magnesium halide and an aromatic orthocarboxylic acid ester with titanium tetrachloride, an organoaluminum compound and an electron donative compound. These catalysts are, however, still insufficient in the polymerization activity and the crystallinity of polymers obtained.

SUMMARY OF THE INVENTION

An object of this invention is to provide a process for the stereospecific polymerization of α-olefins, obtaining polymers of high crystallinity with a catalytic system of high activity.

Another object of this invention is to provide a carrier-type titanium catalyst having a high polymerization activity and being capable of forming polymers with a high stereospecificity.

According to this invention, polymerization of α-olefins is carried out in the presence of a catalytic system comprising a carrier-type activated titanium compound, an organoaluminum compound and an electron donative compound, said activated titanium compound being obtained by copulverizing magnesium halide, an orthocarboxylic acid ester and a halogenated hydrocarbon and then treating the copulverized products with titanium halide.

The characteristic of this invention is to add an orthocarboxylic acid ester simultaneously with a halogenated hydrocarbon upon the copulverization step for preparing the activated titanium compound thereby attaining effects which cannot be obtained with separate use of the above two components.

DETAILED DESCRIPTION OF THE INVENTION

Magnesium halide which may be used in the preparation of the carrier-type titanium compound is, preferably, a substantially anhydrous magnesium halide and particularly, magnesium chloride is preferred.

The orthocarboxylic acid ester which may be used is represented by the formula, $$X^1C(OR^1)_3$$

wherein $R^1$ is a hydrocarbon group of 1–12 carbon atoms, three $R^1$s may be the same or different and $X^1$ is hydrogen or a hydrocarbon group of 1–12 carbon atoms. Preferably, $R^1$ is an aliphatic, alicyclic or aromatic hydrocarbon group of 1–8 carbon atoms and $X^1$ is hydrogen or an aliphatic, alicyclic or aromatic hydrocarbon group of 1–10 carbon atoms. Examples of these compounds include $HC(OCH_3)_3$, $HC(OC_2H_5)_3$, $CH_3C(OCH_3)_3$, $CH_3C(OC_2H_5)_3$, $C_2H_5C(OCH_3)_3$, $C_2H_5C(OC_2H_5)_3$, $C_3H_7C(OC_2H_5)_3$, $C_6H_5C(OCH_3)_3$, $C_6H_5C(OC_2H_5)_3$ and $p\text{-}CH_3C_6H_5C(OCH_3)_3$. An amount of the orthocarboxylic acid ester is not particularly limited, though 0.02–0.2 moles per 1.0 mole of magnesium halide are preferred.

The halogenated hydrocarbon which may be used in the preparation of the titanium catalyst component is halogen-substituted aliphatic, alicyclic and aromatic hydrocarbons. Particularly, preferred are halogenated hydrocarbons of 1–20 carbon atoms having 1–10 halogen atoms substituted therefor, e.g. methylene chloride, dichloroethane, trichloroethane, chloropropane, trichloropropane, chlorobutane, trichlorobutane, carbon tetrachloride, perchloroethylene, chlorobenzene, dichlorobenzene, trichlorobenzene, α,α-dichlorotoluene and α,α,α-trichlorotoluene. An amount of the halogenated hydrocarbon is not particularly limited, though 0.01–0.2 moles per 1.0 mole of magnesium halide are preferred.

The pulverization operation should be conducted in substantially the absence of oxygen and moisture by means of a pulverizer such as a ball mill or a vibration mill. The pulverization conditions are not particularly limited, though the temperature is between 0° C. and 80° C. in general. The pulverization time varies depending on type of the pulverizer, but is normally between 2 and 100 hours.

The order in the pulverization treatment of the magnesium halide, the orthocarboxylic acid ester and the halogenated hydrocarbon is not particularly limited. Any two components of the above three components, first, are copulverized and then the third component is added and pulverized together. Also the three components may be copulverized simultaneously. Furthermore, the orthocarboxylic acid ester and the halogenated hydrocarbon may be added little by little to magnesium halide and pulverized together.

Next, the copulverized products thus obtained are subject to contact treatment with titanium halide. Examples of titanium halide which may be used include titanium tetrachloride, titanium tetrabromide and the like and particularly, titanium tetrachloride is preferred. The contact treatment may be conveniently effected by suspending the above copulverized products in titanium halide or in its solution in an inert solvent, maintaining the contact at temperatures of 0°–200° C., preferably 50°–135° C. and then separating the solid material, followed by drying or removing free titanium halide by washing with an inert solvent to obtain the activated titanium compound. The term of the inert solvent used herein means aliphatic, aromatic or alicyclic hydrocarbons and mixtures thereof.

Further, the activated titanium compound may be obtained by copulverizing magnesium halide and an aliphatic or alicyclic orthocarboxylic acid ester in an amount of 0.01–0.15 moles per 1.0 mole of said magnesium halide and subjecting the copulverized products to contact treatment with titanium halide. In the above-mentioned U.S. Pat. No. 4,220,745 there is disclosed the carrier-type titanium catalyst which is obtained by copulverizing magnesium halide and an aromatic orthocarboxylic acid ester and subjecting the copulverized product to contact treatment with titanium halide. It has, now, been found that the activated titanium compound useful for a polymerization catalyst is obtained by treating a copulverized product of magnesium halide and an aliphatic or alicyclic orthocarboxylic acid ester in a specific molar ratio with titanium halide. When the amount of the aliphatic or alicyclic orthocarboxylic acid ester is more than 0.15 moles based on 1.0 mole of magnesium halide, a polymerization activity of the activated titanium catalyst is hardly exerted. On the other hand, when the amount is less than 0.01 mole, stereospecificity of polymers obtained is reduced remarkably. Preferred range is between 0.05 and 0.10 mole.

In accordance with this invention, the activated titanium compound thus obtained is combined with an organoaluminum compound and an electron donative compound to form a catalyst of high activity for polymerization of α-olefins.

The organoaluminum compound which may be used is represented by the formula,

$$AlR^2_m X^2_{3-m}$$

wherein $R^2$ is a hydrocarbyl group, $X^2$ is an alkoxyl group or hydrogen or halogen atoms and m is 1.5–3.

The typical examples include triethylaluminum, tri-n-butylaluminum, tri-isobutylaluminum, tri-n-hexylaluminum, diethylaluminum monochloride, diethylaluminum iodide, diethylaluminum monobromide, diethylaluminum hydride, diethylaluminum ethoxide and others. They may be used alone or in mixture of two or more. A mole ratio of the organoaluminum compound to titanium metal of the activated titanium component is not limited, though it is within preferably, the range of 1 to 500.

Electron donative compounds which are usually used in the α-olefin polymerization may be used in the catalysts of this invention. Preferred electron donative compounds are organic acid esters, orthocarboxylic acid esters or organosilicon compounds having at least one alkoxyl group. Examples of the organic acid ester are methyl formate, methyl acetate, ethyl acetate, anryl acetate, methyl acrylate, methyl methacrylate, methyl benzoate, ethyl benzoate, methyl toluylate, ethyl toluylate, methyl anisate and ethyl anisate. Examples of the orthocarboxylic acid ester are ethyl orthoacetate, ethyl orthobenzoate, methyl orthobenzoate, methyl orthotoluylate, ethyl orthotoluylate, methyl orthoanisate and ethyl orthoanisate. Examples of the organosilicon compound are $Si(OC_2H_5)_3Cl$, $Si(OC_2H_5)_2Cl_2$, $Si(OCOCH_3)(OC_2H_5)Cl_2$, $Si(OC_2H_5)_4$, $Si(C_2H_5)_2(OC_2H_5)_2$, $Si(C_6H_5)(OC_2H_5)_3$ and $Si(CH_3)(C_6H_5)(OCH_3)_2$.

The activated titanium compound, the organoaluminum compound and the electron donative compound may be brought into contact in any order of addition. Any two components of the above three components are, first, contacted with each other and then the third component is contacted therewith. Also, the three component mat be added simultaneously. It is, particularly, preferred that a part or all of the electron donative compound to be added is allowed to exist when contacting the activated titanium compound with the organoaluminum compound to commence the polymerization.

An amount of the electron donative compound is within, preferably, the range of 0.1–0.5 moles per 1.0 mole of the organoaluminum compound.

This invention may be applied to a homopolymerization or copolymerization of α-olefins of the formula,

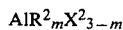

$$R^3-CH=CH_2$$

wherein $R^3$ is an alkyl group of 1–10 carbon atoms, or a copolymerization of the above α-olefin with ethylene. Examples of the α-olefin are propylene, butene-1, hexen-1, 4-methyl-pentene-1 and the like.

The polymerization procedure according to this invention may be carried out in the conventional method using usual conditions. The polymerization temperature is generally in the range of 0°–100° C., preferably 20°–90° C. and the pressure is in the range of from normal pressure to 50 atms., preferably from normal pressure to 40 atms.

In the polymerization reaction, a solvent such as an aliphatic, alicyclic or aromatic hydrocarbon or mixture thereof may be used and may be, for example, propane, butane, pentane, hexane, heptane, cyclohexane, benzene, toluene or mixtures thereof. Also, a bulk polymerization may be employed using liquid monomers themselves as the solvent. Alternatively, the polymerization reaction may be conducted in the vapour phase wherein gaseous monomers are directly contacted with the catalyst without use of a solvent.

The molecular weight of polymers produced by the method of this invention varies depending on the manner of reaction, kind of catalyst and polymerization conditions. However, the molecular weight may be controlled by adding to the reaction system, for example, hydrogen, an alkyl halide and a dialkyl zinc, if necessary.

According to this invention, poly-α-olefins of high yield per unit weight of the catalyst are obtained with high crystallinity to such degree that there is substantially no need to remove non-crystalline poly-α-olefins which have bad influence on physical properties of polymers obtained.

This invention will be illustrated by way of the following examples. Also, for the purpose of comparison there are set forth Reference Examples which are beyond the scope of this invention.

EXAMPLE 1

[A]: 20 g of magnesium halide and 1.5 ml of ethyl orthoacetate and 3.5 ml of 1,2-dichloroethane were charged under nitrogen atmosphere into a vibration mill provided with a pot of 600 ml in inner volume, in which 80 steel balls with a diameter of 12 mm were placed, and were subjected to pulverization for 40 hours. 10 g of the pulverized products thus obtained and 50 ml of TiCl₄ were charged into a 200 ml round-bottomed flask and stirred at 80° C. for two hours and thereafter, the supernatant liquid was removed by decantation. Next, after repeating seven times a washing treatment consisting of stirring with 100 ml of n-heptane at room temperature for 15 minutes and then removing the supernatant liquid by decantation, further 100 ml of n-heptane were added to obtain an activated titanium compound slurry. A part of the activated Ti compound slurry was sampled and subjected to analysis after evaporating n-heptane. A Ti content of the activated Ti compound was 1.48% by weight.

[B]: 1.0 l of n-heptane, 100 mg of the above activated Ti compound, 0.20 ml of triethyl aluminum, 0.18 ml of diethylaluminum chloride and 0.12 ml of methyl p-toluylate were charged into a stainless steel autoclave of 3.0 l in capacity under nitrogen atmosphere. After exhausting the nitrogen gas from the autoclave by means of a vacuum pump, gaseous hydrogen was fed till a partial pressure of 0.1 kg/cm² and then, propylene was fed till a vapour pressure of 2 kg/cm².Gauge. The autoclave was heated and after 5 minutes, the inner temperature was elevated to 70° C. While feeding propylene to maintain the pressure at 5 kg/cm².Gauge at 70° C., polymerization was continued for two hours.

After cooling the autoclave, unreacted propylene was purged and the contents were removed, filtered and dried at 60° C. under reduced pressure. Thus 325 g of a white powdery polypropylene were obtained.

Extraction residue of polymer with boiling n-heptane (hereunder referred to as "Powder II"): 96.8%
Bulk density: 0.38 g/ml
Limiting viscosity number (135° C., tetralin): 1.52

On the other hand, 3.9 g of polymers soluble in n-heptane were obtained by concentration of the filtrate. The ratio of the extraction residue of polymer with boiling n-heptane to the total polymer (hereinafter referred to as "Total II") was 95.7%. A polymerization activity of the catalyst in this Example was 111 kg/g.Ti.hr and the yield of polymer was 3289 g/g.Activated Ti catalyst.

REFERENCE EXAMPLE 1

An activated Ti compound was obtained in the same procedure as in Example 1-A except not using ethyl orthoacetate in the copulverization step. The Ti content was 1.98 wt. %. Using 100 mg of the activated Ti compound obtained, polymerization of propylene was carried out in the same manner as in Example 1-B. The results are set forth in Table 1, from which it is clear that the yield of polymer per unit weight of the activated Ti catalyst and Total II are inferior to those of Example 1.

REFERENCE EXAMPLE 2

An activated Ti compound was obtained in the same procedure as in Example 1-A except using 20 g of magnesium halide and 2.0 ml of methyl orthobenzoate and not using a halogenated hydrocarbon in the copulverization step. The Ti content was 1.42% by weight. The results including the polymerization test are set forth in Table 1, from which it is clear that the yield of polymer per unit weight of the activated Ti catalyst and the Total II are inferior to those of Example 1.

EXAMPLES 2-5

An activated Ti compound was obtained in the same manner as in Example 1-A except varying additives upon the copulverization as indicated in Table 1. Using the activated Ti compound obtained, polymerization of propylene was carried out in the same manner as in Example 1-B. The results are set forth in Table 1, from which it is clear that the yield of polymer per unit weight of the activated Ti catalyst and the Total II are superior to those of Reference Examples.

TABLE 1

| Run No. | Additives upon Copulverization | | | Ti Content wt. % | Polymerization Activity kg/g · Ti · hr | Yield of Polymer g/g · Activated Ti Catalyst | Limiting Viscosity Number | Bulk Density (g/ml) | Total II % |
|---|---|---|---|---|---|---|---|---|---|
| | MgCl₂ (g) | Orthocarboxylic acid ester (ml) | Halogenated hydrocarbon (ml) | | | | | | |
| Ref. Ex. 1 | 20 | — | 1,2-Dichloroethane 3.0 | 1.95 | 55 | 2150 | 1.58 | 0.34 | 91.7 |
| Ref. Ex. 2 | 20 | Methyl orthobenzoate 2.0 | — | 1.42 | 74 | 2100 | 1.64 | 0.34 | 91.5 |
| Ex. 2 | 20 | Ethyl orthobenzoate 2.0 | 1,2-Dichloroethane 3.0 | 1.42 | 161 | 4576 | 1.53 | 0.38 | 94.6 |
| Ex. 3 | 20 | Methyl orthobenzoate 2.0 | 1,2-Dichloroethane 3.0 | 1.72 | 163 | 5600 | 2.03 | 0.38 | 94.7 |
| Ex. 4 | 20 | Methyl orthobenzoate 2.0 | 1,1,2,2-tetrabromoethane 1.5 | 1.49 | 141 | 4202 | 1.62 | 0.39 | 95.0 |
| Ex. 5 | 20 | Ethyl orthoformate 0.5 | 1,2-Dichloroethane 3.5 | 1.62 | 128 | 4147 | 1.75 | 0.38 | 93.9 |

What is claimed is:
1. In a process for the stereospecific polymerization of α-olefins in the presence of a catalytic system comprising a titanium compound supported on a carrier, an organoaluminum compound and an electron donative compound, the improvement which comprises using an activated titanium compound obtained by copulverizing magnesium chloride, an orthocarboxylic acid ester represented by the formula, $$X^1C(OR^1)_3$$

wherein $X^1$ is hydrogen or a hydrocarbon group of 1-12 carbon atoms and $R^1$ is a hydrocarbon group of 1-12 carbon atoms and a 1-10 halogen atom(s)-substituted hydrocarbon having 1-20 carbon atoms and then treating the copulverized product with titanium tetrachloride by suspending the copulverized product in the titanium tetrachloride or a solution thereof as said titanium compound supported on a carrier.

2. A catalytic system for the stereospecific polymerization of α-olefins comprising a titanium compound supported on a carrier, an organoaluminum compound and an electron donative compound, in which said titanium compound supported on a carrier is obtained by copulverizing magnesium chloride, an orthocarboxylic acid ester represented by the formula, $$X^1C(OR^1)_3$$

wherein $X^1$ is hydrogen or a hydrocarbon group of 1-12 carbon atoms and $R^1$ is a hydrocarbon group of 1-12 carbon atoms and a 1-10 halogen atom(s)-substituted hydrocarbon having 1-20 carbon atoms and then treating the copulverized product with titanium tetrachloride by suspending the copulverized product in the titanium tetrachloride or a solution thereof.

* * * * *